(12) United States Patent
Busam et al.

(10) Patent No.: US 12,260,575 B2
(45) Date of Patent: Mar. 25, 2025

(54) SCALE-AWARE MONOCULAR LOCALIZATION AND MAPPING

(71) Applicant: HUAWEI TECHNOLOGIES CO., LTD., Guangdong (CN)

(72) Inventors: Benjamin Busam, Munich (DE); Gregory Slabaugh, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 639 days.

(21) Appl. No.: 17/513,596

(22) Filed: Oct. 28, 2021

(65) Prior Publication Data

US 2022/0051425 A1 Feb. 17, 2022

Related U.S. Application Data

(63) Continuation of application No. PCT/EP2019/061071, filed on Apr. 30, 2019.

(51) Int. Cl.
*G06K 9/00* (2022.01)
*G06T 3/18* (2024.01)
*G06T 3/40* (2006.01)
*G06T 7/55* (2017.01)
(Continued)

(52) U.S. Cl.
CPC .............. *G06T 7/55* (2017.01); *G06T 3/18* (2024.01); *G06T 3/40* (2013.01); *G06T 7/60* (2013.01); *G06T 7/73* (2017.01); *G06T 2207/10016* (2013.01); *G06T 2207/10021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 10,380,753 B1 * 8/2019 Csord?s ................. G06V 10/52
10,580,206 B2 * 3/2020 Lin ............................ G06T 7/55
10,664,999 B2 * 5/2020 Gupta .................... G06N 3/045
(Continued)

FOREIGN PATENT DOCUMENTS

| CN | 105825520 A | 8/2016 |
| CN | 106127739 A | 11/2016 |
| CN | 107945265 A | 4/2018 |

OTHER PUBLICATIONS

Wang et al., "MVDepthNet: Real-Time Multiview Depth Estimation Neural Network," 2018 International Conference on 3D Vision (3DV), Verona, Italy, 2018, pp. 248-257, doi: 10.1109/3DV.2018.00037. (Year: 2018).*
(Continued)

*Primary Examiner* — Feng Niu
(74) *Attorney, Agent, or Firm* — WOMBLE BOND DICKINSON (US) LLP

(57) ABSTRACT

Disclosed is an image processing device comprising a processor configured to estimate the scale of image features by the steps of: processing multiple images of a scene by means of a first trained model to identify features in the images and to estimate the depths of those features in the images; processing the multiple images by a second trained model to estimate a scaling for the images; and estimating the scales of the features by adjusting the estimated depths in dependence on the estimated scaling. A method for training an image processing model is also disclosed.

20 Claims, 10 Drawing Sheets

(51) Int. Cl.
    *G06T 7/60*      (2017.01)
    *G06T 7/73*      (2017.01)

(56) References Cited

U.S. PATENT DOCUMENTS

| | | | | |
|---|---|---|---|---|
| 10,755,428 | B2* | 8/2020 | Aswin | G06N 3/0418 |
| 10,839,573 | B2* | 11/2020 | Marino | G06Q 30/0276 |
| 10,841,491 | B2* | 11/2020 | Mathy | H04N 5/2226 |
| 11,227,149 | B2* | 1/2022 | Han | G06V 40/20 |
| 11,257,272 | B2* | 2/2022 | Rowell | G06T 1/0014 |
| 11,281,921 | B2* | 3/2022 | Nikitidis | G06V 40/16 |
| 11,302,026 | B2* | 4/2022 | Tang | G06T 7/70 |
| 11,423,615 | B1* | 8/2022 | Villalon | G06T 7/187 |
| 11,580,653 | B2* | 2/2023 | Groh | G06T 7/50 |
| 2017/0272651 | A1* | 9/2017 | Mathy | H04N 5/2226 |
| 2017/0278289 | A1* | 9/2017 | Marino | G06T 7/536 |
| 2018/0261005 | A1 | 9/2018 | Lin et al. | |
| 2019/0122378 | A1* | 4/2019 | Aswin | G06T 7/20 |
| 2019/0251707 | A1* | 8/2019 | Gupta | G06T 9/002 |
| 2020/0126249 | A1* | 4/2020 | Tang | G06F 3/01 |
| 2020/0210690 | A1* | 7/2020 | Han | G06T 7/73 |
| 2020/0342652 | A1* | 10/2020 | Rowell | G06V 10/82 |
| 2021/0042946 | A1* | 2/2021 | Groh | B60W 60/001 |
| 2021/0049371 | A1* | 2/2021 | Gu | G06N 3/088 |
| 2021/0209387 | A1* | 7/2021 | Nikitidis | G06V 10/764 |
| 2024/0161292 | A1* | 5/2024 | Bergman | A61B 6/5217 |

OTHER PUBLICATIONS

Gurram et al., "Monocular Depth Estimation by Learning from Heterogeneous Datasets." arXiv preprint arXiv:1803.08018 (2018). (Year: 2018).*

Yinda Zhang et al:ActiveStereoNet:End to End Self Supervised Learning for Active Stereo Systems arxiu.0 rg Cornell University Library 201 Olin Library Cornell University Ithaca NY14853 Jul. 16, 2018 (Jul. 16, 2018) XP081249073,total:26pages.

Raul Mur-Artal, et al.,."Visual-Inertial Monocular SLAM with Map Reuse", Submitted Jan. 17, 2017,Accepted for publication in IEEE Robotics and Automation Letters,total:9pages.

Choi Sungil et al: .Learning Descriptor Confidence and Depth Estimation in Multi view Stereo 2018 IEEE/CVF Conference on Computer Vision and Pattern Recognition Workshops (CVPRW) IEEE Jun. 18, 2018 (Jun. 18, 2018) pp. 389 3896,XP033475662 total:7pages.

Jakob Engel et al.,"Direct Sparse Odometry",Oct. 7, 2016,total:17pages.

Yao Yao et al:MUSNet:Depth Inference for Unstructured Multi view Stereo Oct. 7, 2018 (Oct. 7, 2018) International Conference on Financial Cryptography and Data Security;[Lecture Notes in Computer Science;Lect.Notes Computer] Springer Berlin Heidelberg p. 785 801XP047488996 total:17pages.

Raul Mur-Artal et al., "ORB-SLAM2: an Open-Source SLAM System for Monocular, Stereo and RGB-D Cameras", Jun. 19, 2017,total:9pages.

Smolyanskiy Nikolai et al: On the Importance of Stereo for Accurate Depth Estimation:An Efficient Semi Supervised Deep Neural Network Approach 2018 IEEE/CVF Conference on Computer Vision and Pattern Recognition Workshops (CVPRW) IEEE Jun. 18, 2018 (Jun. 18, 2018) pp. 1120 11208 XP033475442 total:9pages.

Jonathan T. Barron et al.,"A General and Adaptive Robust Loss Function", Apr. 4, 2019,CVPR 2019,total:19pages.

Yan Wang et al:Anytime Stereo Image Depth Estimation on Mobile Devices arxiu.0 rg Cornell University Library 201 Olin Library Cornell University Ithaca NY 14853 Oct. 26, 2018 (Oct. 26, 2018) XP081128741 total:8pages.

Sameh Khamis et al.,"StereoNet: Guided Hierarchical Refinement for Real-Time Edge-Aware Depth Prediction", Proceedings of the European Conference on Computer Vision (ECCV), 2018,total:18pages.

Yinda Zhang et al.,"ActiveStereoNet: End-to-End Self-Supervised Learning for Active Stereo Systems",2018ECCV,total:18pages.

Yao Yao et al.,"MVSNet: Depth Inference for Unstructured Multi-view Stereo",ECCV2018,total:17pages.

J. Engel et al. LSD-SLAM: Large-scale direct monocular SLAM. ECCV 2018,total:16pages.

* cited by examiner

Fig. 2
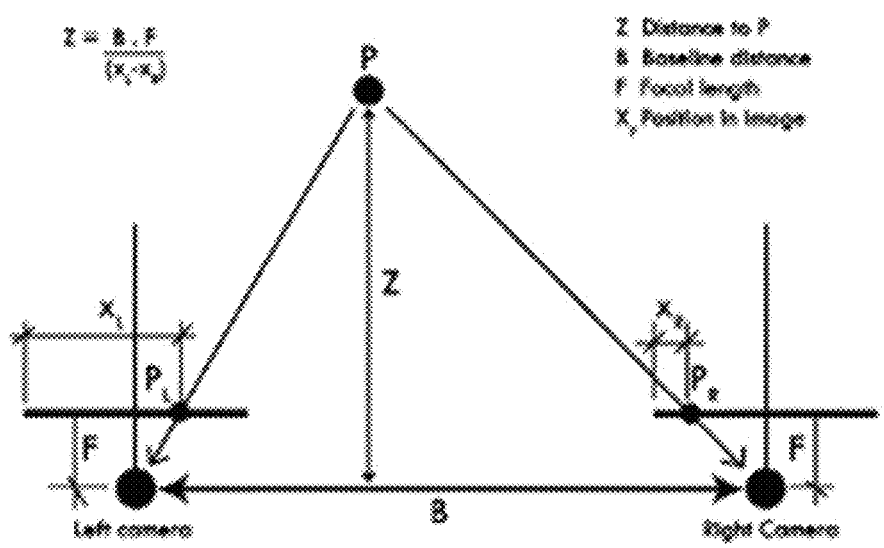
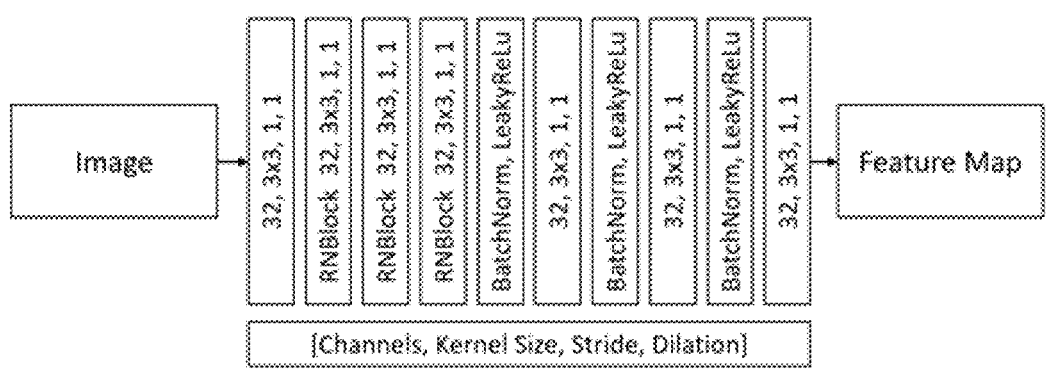
Fig. 5

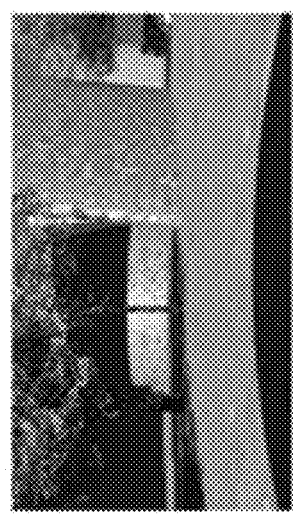
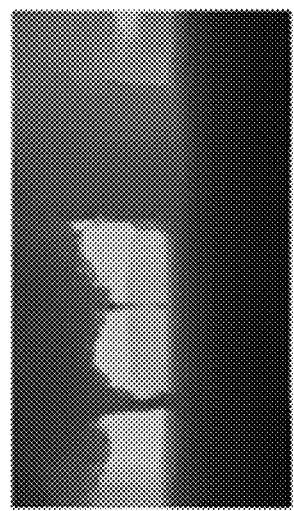
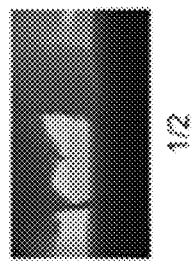
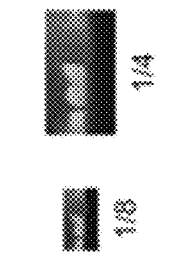
Fig. 8 (a) Fig. 8(b) Fig. 8 (c) Fig. 8 (d) Fig. 8 (e)

SCALE-AWARE MONOCULAR LOCALIZATION AND MAPPING

CROSS-REFERENCE TO RELATED APPLICATIONS

This application is a continuation of International Application No. PCT/EP2019/061071, filed on Apr. 30, 2019. The disclosures of the aforementioned application is hereby incorporated by reference in its entirety.

FIELD OF THE APPLICATION

This disclosure relates to resolving scale ambiguity when projecting an image captured by a digital camera.

BACKGROUND

Digital cameras capture an image by means of light falling on a digital sensor, which transforms the collected light into digital data, known as the raw data. The raw data is then processed to create a raster image formed as a pixel field, where each pixel represents the brightness and colour received at a region of the digital sensor representative of a region of the image that was captured. The pixel field can then be displayed on a screen such that it is human-viewable. Thus the captured image has been projected. Both the raw data and the processed data can be stored and transmitted to another device, thereby allowing further recreations of the captured image as and when required.

If the image is a scene, which could be an outdoor or an indoor scene, it will typically include a number of objects or features. In some circumstances, it may be desirable to be able to identify an object that forms part of the scene. For example, if an object such as a restaurant is part of the scene, it could be useful to identify the restaurant and thereby enable the restaurant to be found and its name, location etc. to be provided to a device whose user is looking for a restaurant in the area in which the identified restaurant is located. Alternatively or additionally, identifying an object may be useful in order to adjust and/or enhance its appearance when displayed. In circumstances where a single camera is capturing the image, a difficulty is knowing how far away the object is from the camera. This is usually apparent at least to some extent for a person viewing a scene in real life. For example, if a car is the object and it appears to be around a metre tall (approx. 3 ft.), the person, knowing that an average car is about 1.3 m (approx. 4 ft.) tall would deduce that the car must be about 10 m (30 ft.) away. This is because the person would discount the possibility of it being the height of, say a house, but much further away, and would likewise discount the possibility of it being the height of, say a dog, but much closer. However, a digital image processor is not armed with such human knowledge about what an object is and thus its approximate likely size, and hence is not able to deduce how far away it is in such a manner. In other words, the scale of the object is ambiguous because its distance from the viewpoint is unknown. Moreover, the appearance of an image projected by a digital camera also depends on the distance of the sensor plane from the optical centre of the camera—different cameras at a same location might capture the scene in different sizes. Thus one aspect of the processing of the raw image data involves accounting for ambiguities in the scale of objects in a captured image, thereby enabling their depth (i.e. distance from the camera) to be ascertained, such that the image can be accurately projected and enhanced.

An image acquired by a single camera is known as monocular vision. One way in which the depths of objects forming part of the image can be determined is by having the camera move whilst capturing the image. Thus a video sequence is captured over a time period in which the camera is moving, the location from which each frame of the sequence is captured depending on where the camera has moved to at the instant the frame is captured. Processing such a video sequence captured by the moving camera can enable simultaneous localization and mapping (SLAM) up to a scaling factor. This is because the principle of parallax can be used i.e. that the same object appears differently-sized depending how far away it is from the camera. Thus if an image is acquired from two (or more) different spatial locations, points that are seen in both images at different pixel locations can be triangulated. The relationship between the two images is described by their epipolar geometry, which can be used as part of the digital processing to create the pixel field. The difference in pixel location of a point in the scene is called the disparity and is inversely proportional to the distance of the point from the camera (i.e. the depth). If the depth is encoded across an image it is called a depth map. Its equivalent difference image is called a disparity map. The camera position can be localized whilst mapping its surroundings and updates with input of direct images or featured keypoints can be used for relocalization.

Monocular SLAM techniques usually result in scale ambiguity even after the triangulation processing described above. Existing digital image processors use algorithms to process a captured image. The part of the processing to determine scale can broadly be divided into statistics-based and learning-based methods for the algorithms. Statistics-based approaches have the drawback of requiring a significant amount of processing power, which may be disadvantageous in terms of the time taken and/or constraints on physical component size. Therefore, more recently, neural networks have begun to be used to create algorithms. Existing methods address the problem of scale ambiguity in three different ways. They either use monocular depth estimation (1) or an additional sensor (2) to estimate depth or they remain scale ambiguous (3). Each is described in more detail in the following:

(1) Methods that use monocular depth estimation address a highly under-constrained problem and learn how to infer distances based on visual cues (e.g. a car usually is X m long, . . . ) and fully rely on the things they have seen while being trained. The problem is ill-posed and thus the results are inaccurate and do not generalize to previously unseen scenes.

(2) Additional sensors such as a second camera, active depth sensors, or inertial measurement units (IMU) enable systems to recover scale aware measures directly, but this comes at the cost of additional hardware and the need to fuse information from different modalities, plus there are calibration costs in determining the spatial displacements between the first camera and the additional sensor.

(3) Scale-ambiguous approaches are those that do not recover the scale. A scale parameter "s" is set initially at random (usually to 1) and all consecutive measures are referred to this. Measurements will only be in units of "s" times the measurement unit. No virtual content can be placed metrically correct within these scenes.

CN 107945265 A is an example of approach (1) and describes a SLAM method based on an online learning depth prediction network, which involves prediction of a full depth map and a very specific voting scheme. It relies on knowledge of objects, which means that it is prone to failure when confronted with an unknown object or a known object that does not conform to previously-seen objects of that type e.g. if it is familiar with trees such as apple trees, knowing them to be around 3 m (10 ft.) tall, it will struggle to recognize a sequoia which could be around 100 m (350 ft.) tall as being a tree. CN 106127739 A is an example of approach (2) and describes a SLAM method that relies on monocular depth estimation, requiring a combination of a monocular camera and a depth sensor, as well as an additional hardware sensor to estimate scale. CN 105825520 A is an example of approach (3) and describes another monocular SLAM method which is capable of creating a large-scale map, but is not scale aware.

It would be desirable to provide a technique capable of delivering accurate scale and depth prediction performance, which minimizes processing requirements.

SUMMARY OF THE APPLICATION

According to a first aspect there is provided an image processing device comprising a processor configured to estimate the scale of image features by the operations of: processing multiple images of a scene using a first trained model to identify features in the images and to estimate the depths of those features in the images; processing the multiple images by a second trained model to estimate a scaling for the images; and estimating the scales of the features by adjusting the estimated depths in dependence on the estimated scaling. This can allow the depth and hence the scale of features of a scene to be inferred without the need for extra hardware or knowledge of scene features.

Some examples of features whose scales may be estimated by the device include pixels, distance of pixels, and image artefacts that collectively represent an object or a specific part of an object. The depth may be a distance from a camera that took the image. The camera may be the device or may comprise the device or may be a part of the device.

The multiple images may comprise images of the scene captured from different locations. This can allow two images from a monocular moving camera to be used, or from two different cameras.

The first and second trained models may be configured to operate independently of the distance between the said locations. Thus camera speed does not matter.

The multiple images may comprise images of the scene captured at different times. This is also compatible with capturing the images from a single moving camera.

The multiple images may be frames in a common video stream. This allows simultaneous localization of a moving camera and feature mapping.

In some embodiments, the image processing device comprises a camera and the multiple images are images captured by the camera. Thus processing can be carried out by the camera. In other embodiments, some or all of the processing can be carried out by another device such as a server or a computer in the cloud.

The estimated depths can be relative distances. This could be relative distances between objects. Thus objects can be correctly reconstructed relative to each other.

The estimated scales can be absolute distances. This could be an actual distance in measurement units (e.g. metres, yards etc.) from the camera capturing the images. As well as enabling accurate reconstruction of the object as part of an image, this information can be used to determine what an object is.

The device may be configured to: operate the first trained model on downsampled images of the scene to form a set of data comprising estimates of the depths of features in the downsampled images; and process the said set of data to upscale its resolution. This enables a smaller amount of data to be stored and used for the depth map calculation, for example in a mobile device with limited storage and/or processing power. However, the upscaling allows good resolution of the resulting image.

According to a second aspect there is provided a method for training an image processing model, comprising: (a) receiving a plurality of pairs of images, each pair of images representing a common scene and the images of that pair being captured from different locations spaced apart by a distance; (b) for each pair of images: (i) receiving ground truth data comprising an estimate of the scales of regions in the images; (ii) processing the images by a first model to identify features in the images; (iii) processing the images by a second model to estimate the relative depths of the features; (iv) processing the images by a third model to estimate the absolute scale of the images; and (v) adapting one or both of the second and third models in dependence on the ground truth data. This can allow generation of an algorithm which processes image data to resolve scale ambiguity of features of a scene, which algorithm can be used subsequently without the need for additional depth sensors or ground truth information.

The method may further comprise forming the ground truth data by, for each pair of images, estimating the scales of regions of the images by one of (i) a geometric analysis of the images in dependence on the distance between the locations at which the images were captured and (ii) estimating a transformation between the images in dependence on data indicating the relative locations at which the images were captured and the relative directions in which the images were captured. This enables a depth of an object estimated with stereo vision but with an arbitrary scale, to be corrected by an actual scale factor.

In some embodiments, the method comprises, for each pair of images, warping one of those images to a common image frame with the other image of the pair; and wherein the said operations (iii) and (iv) are performed on the warped image and the said other image. This technique can be used to process two images of the same scene e.g. captured generally to the left and generally to the right of the scene, to scale features of the image.

In some embodiments, operation (ii) of the method may comprise processing the images by a first model to identify features in the images and the location of each feature in the respective image. In some embodiments, the method may comprise, for each pair of images, warping locations of features identified in one of those images to a common image plane with the locations of the features identified in the other image of the pair; and wherein the said operations (iii) and (iv) of the method can be performed on the warped feature locations and the feature locations from the said other image. Rectification to a common image plane reduces the quantity of calculations needed because the search space for correspondences among the images is reduced to a single line.

According to a third aspect there is provided an image processing model formed by any of the methods described herein. Such a model can be used to process further images not captured by the same cameras as those used to generate the model.

According to a fourth aspect there is provided an image processing device comprising a processor and a memory, the memory comprising instructions executable by the processor to implement an image processing model adapted by any of the methods described herein. Such a device can therefore be a self-contained unit that can both capture images e.g. of scenes, and process them to be reconstructed, taking account of scales of objects in the scene.

BRIEF DESCRIPTION OF THE DRAWINGS

The present application will now be described by way of example only with reference to the accompanying drawings, in which:

FIG. 2 shows an example of the use of epipolar geometry to triangulate a point;

FIG. 5 shows a feature tower extraction pipeline;

FIGS. 8 (a)-(e) illustrate a depth estimation output from a trained model;

DETAILED DESCRIPTION OF EMBODIMENTS OF THE APPLICATION

Figure 1:
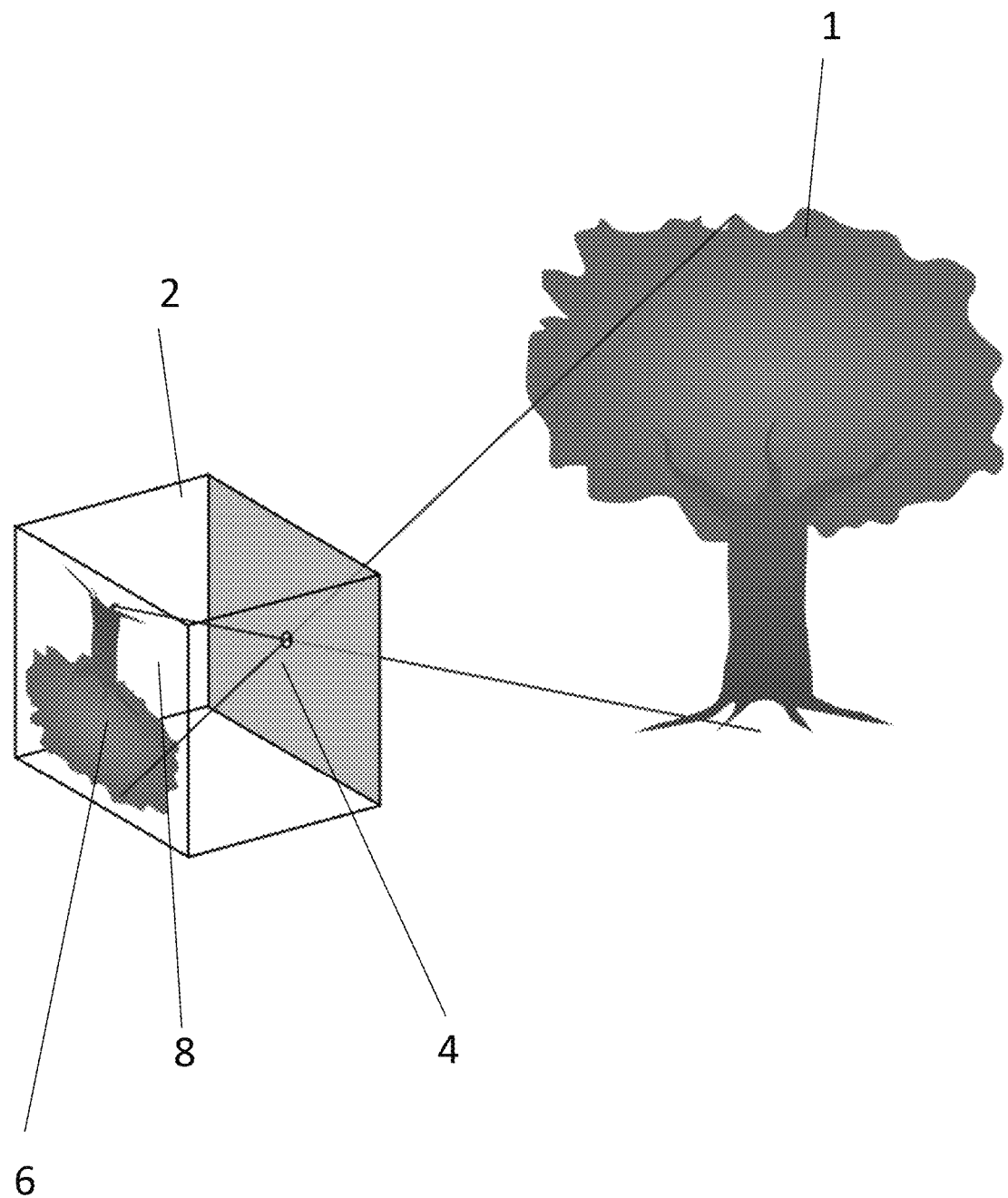
FIG. 1 shows the basic concept of monocular image capture.

FIG. 1 is a schematic illustration of monocular vision. An object 1 forms part of an image being captured. In this case, the object 1 is a tree and an outdoor scene is being captured. A digital camera 2 has an aperture 4, which approximates a pinhole, through which light can enter so as to record an image 6 on a digital sensor 8. The raw data recorded on the digital sensor can be processed in order to reconstruct the image in a human-viewable format, either straight away on a screen of the camera and/or such that it can be transmitted to a separate device for further processing and/or viewing. As explained previously, one difficulty with such processing is that in terms of the depth of objects such as the object 1, the inverse mapping of the raw data back into an image is ambiguous, and hence the scale of the object may not be known.

In order to mitigate the scaling ambiguity, instead of a single image, if the camera 2 is moved whilst it captures multiple images as frames of a video, simultaneous localization of the camera and mapping of captured data back into an accurate reconstruction of the images can be achieved up to a scaling factor. FIG. 2 illustrates how two images of a point P of an object can be triangulated in this way. If two images of point P are obtained from a camera situated in two different locations, the point P will be seen in both images but at different pixel locations. This is known as the effect of parallax. The epipolar geometry of these stereo images can be used to determine the disparity between the two pixel locations. If the same technique is applied to other points of the image, a disparity map can be created. The values of such a map will be inversely proportional to the depths of the points on the map i.e. the distance of those points from the camera. In FIG. 2, the two capture points are labelled as left camera and right camera. This refers to two locations of a moving camera at two different times, although the principle would be the same if the two images were captured by two different cameras. The distance between the two camera locations is the baseline distance and the shortest distance Z from the baseline to the point P can be calculated with reference to where it is seen in each image. Where it appears in each image is dependent on how far the camera location is along the baseline from the point on the baseline at which the distance Z is measured.

The above-described stereo technique can be repeated for multiple pairs of images, thereby processing a video sequence so as to enable simultaneous localization and mapping of the camera. Whilst this is useful in estimating the distance of objects, it only works up to a scaling factor i.e. an arbitrary scale, because the baseline length is chosen arbitrarily. Another issue is that over time and/or distance the camera moves, small errors accumulate, producing drift in the scaling.

In the following a method of training a neural network is described, as well as a method of running the trained model to estimate the scale of image features. Apparatus and devices on which the methods can be implemented are also described. In some embodiments, the method is performed by components of a digital camera, which has monocular vision but which is moving so as to capture a video sequence.

The described neural network can perform both stereo-based depth and scale estimation simultaneously. The method for training the network involves entangling the two. The problem of scale ambiguity is addressed as a multi-task problem consisting of the two tasks (1) scale-ambiguous depth estimation and (2) scale parameter estimation. The two tasks are based on the same data and entangle their results such that each task profits from the other. Task (1) is to estimate a depth map from a temporal monocular input (i.e. images at different time instances) with the scale "s0". Task (2) is to estimate a scaling parameter "st" based on the same data and scale the output of task (1) accordingly. Thus the two tasks can be fused in an end-to-end image processing pipeline. At runtime, the depth estimation branch may be dropped, thereby resolving the scale ambiguity. If the scale ambiguity is resolved, this means that the relative and/or absolute sizes of objects within a scene being captured will be known by using their relative depths within the image or their actual depths (i.e. distance from the camera).

One pipeline processing method to implement scale estimation will now be described.

Figure 3:
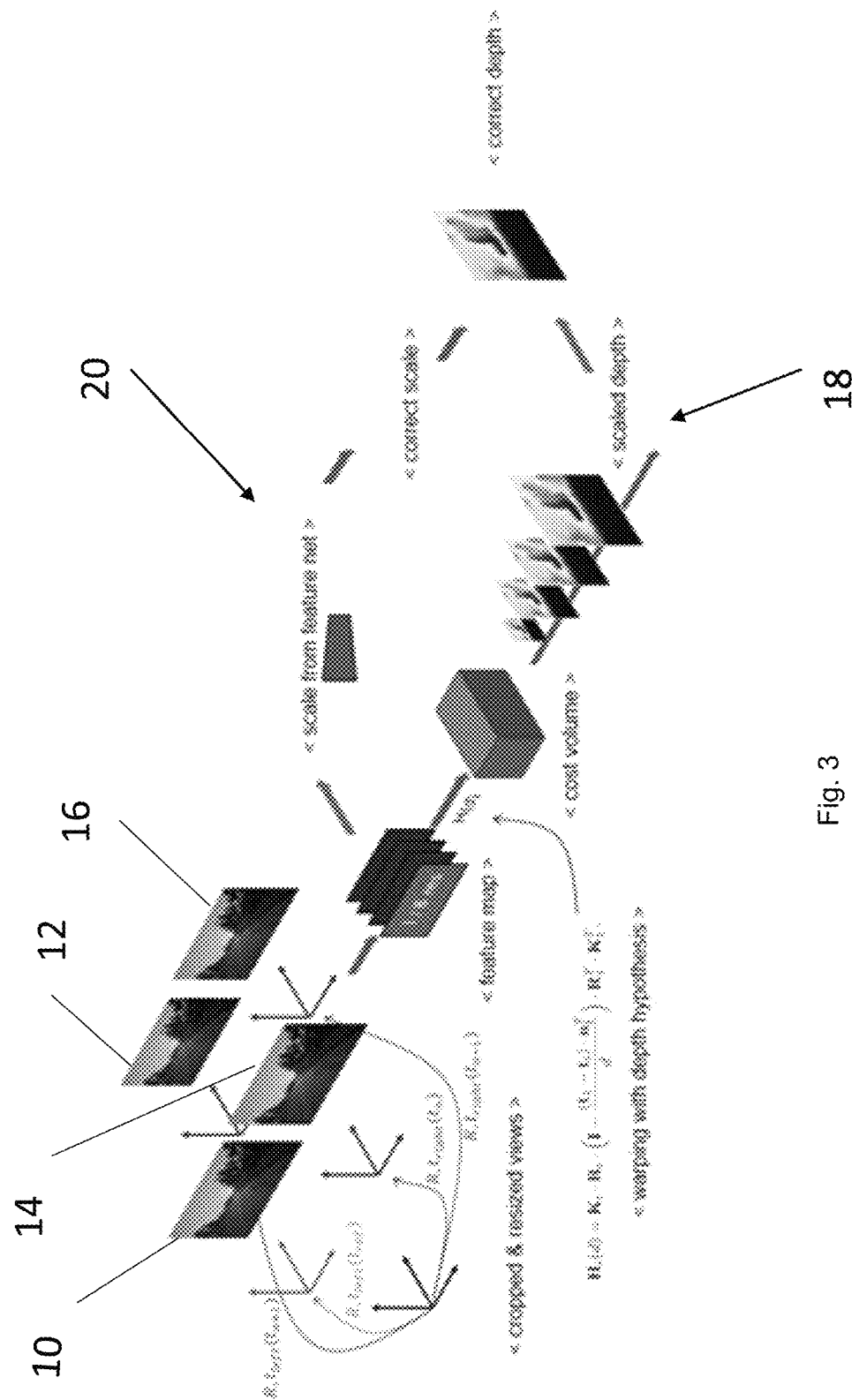
FIG. 3 shows an overview of a stereo-based depth and scale estimation pipeline to train a neural network.

FIG. 3 shows schematically an overview of a processing pipeline that is used in some embodiments as part of a digital image processing of a video captured by a monocular moving camera, in order to train a neural network to resolve scale ambiguity, such that when run, it can work out the correct depths (i.e. distances from the camera in real units) and scales (i.e. physical sizes) of features in the captured images. A spatio-temporal input (e.g. stereo images captured at different times) is fed into the pipeline. For training purposes, two cameras may be used, named left-hand and right-hand, since they may be positioned generally to the left and right of an image such as a scene being captured. Two pairs of images are shown, which it will be understood are exemplary ones of many frames of video that can be captured by two cameras. The left-hand camera takes a first image 10 of a scene at time $t_{ref}$ and a second image 12 at time $t_{n+1}$. The right-hand camera takes a first image 14 of the same scene at time to and a second image 16 at time $t_{n+1}$. These images are cropped and resized and features are extracted from them to produce a feature map. At this point, the process splits into two branches, which in practice can be implemented simultaneously, although this is not essential. A first branch (the lower branch in the figure, indicated generally by reference numeral 18) performs task (1) discussed above (i.e. scale-ambiguous depth estimation). It therefore estimates a scaled depth map. Firstly it warps the feature map to a common reference view—the output to this stage is H(d). This is then put through a cost volume. These operations will be described in more detail below with reference to FIG. 4. The output is an arbitrarily-scaled depth map. Thus this branch can probabilistically describe corresponding image areas alongside their depth. A second branch (upper branch in the figure, indicated generally by reference numeral 20) performs task (2) discussed above (i.e. estimates a scale parameter). This scale parameter can then be used to scale the depth map output by the first branch to the correct value. In this way, the distance of features from the camera can be determined. These distances could be determined for objects of the image or for pixels of the image.

Figure 4:
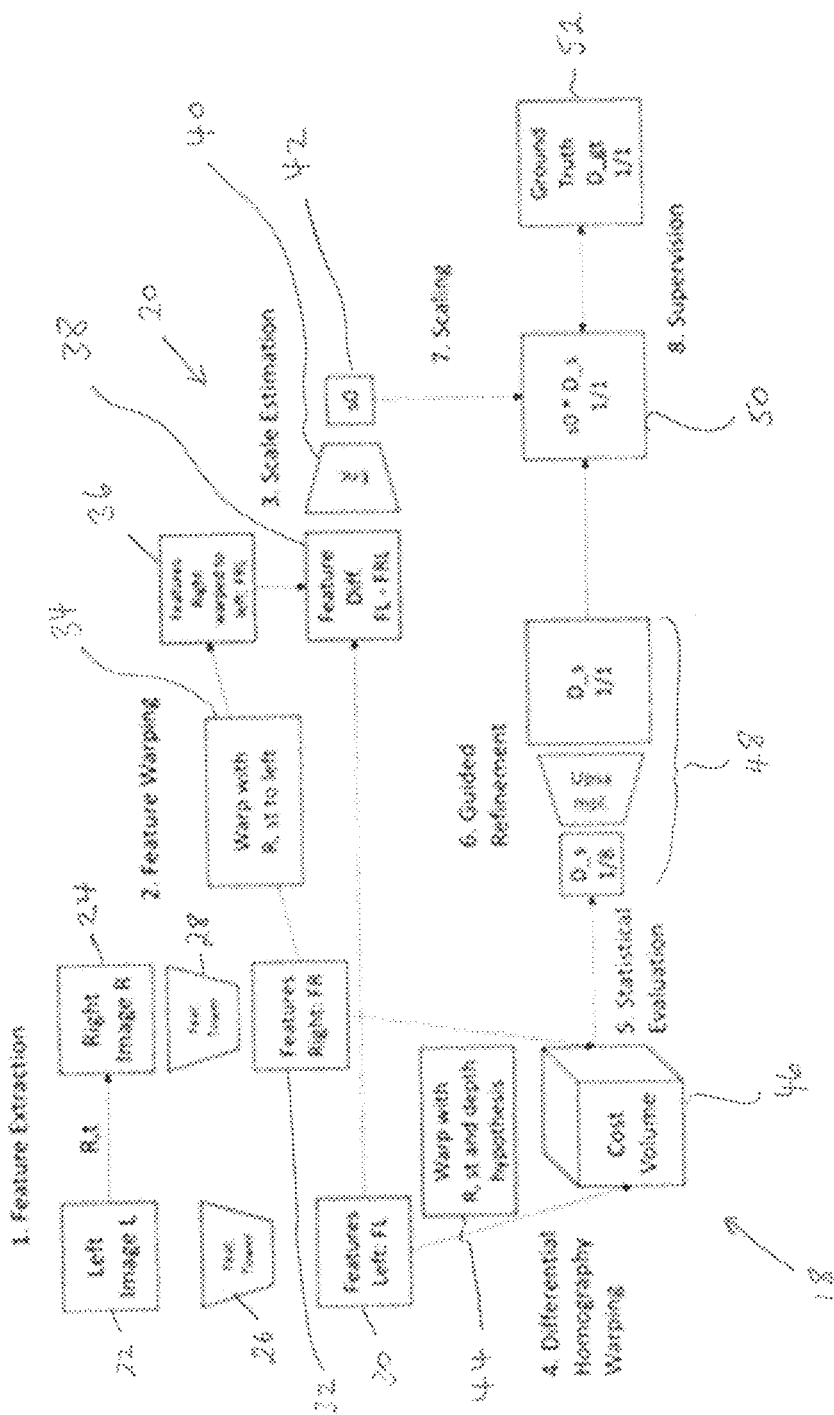
FIG. 4 shows an embodiment of stereo-based depth and scale estimation.

FIG. 4 shows a more detailed embodiment of the training process described with reference to FIG. 3. Before putting images of resolution w×h through the neural network, the two views (taken by left-hand and right-hand cameras respectively, as explained above) are rectified to a common reference plane. As a result, using epipolar geometry, the search space for correspondences among the images is reduced to a horizontal line. In this manner, ground truth data is obtained.

In order to implement the methods described herein, Google's TensorFlow 1.4.1. with Python 2.7 foundation library can be used to create a deep learning model in accordance with embodiments of a neural network processor described herein. Suitable hardware resources include an Intel® Core™ i7-8700 CPU @ 3.20 GHz on a machine with 64 GB Memory and an NVidia GeForce GTX1080 running on Ubuntu 16.04.5 LTS (Xenial Xerus). The embodiment of FIG. 4 is labelled as eight stages, each of which is described in the following.

Stage 1: Feature Extraction

The images for left and right view—for example the images 10, 12, 14, 16 shown in FIG. 3, but represented in FIG. 4 as single blocks 22 (left image L) and 24 (right image R)—are fed, during training, into two respective Siamese feature towers with shared weights. The left image 22 is fed into a first feature tower 26 and the right image 24 is fed into a second feature tower 28. To realize a downscaling (downsampling) one convolution layer, 3 ResNet blocks, can be used, another convolution layer with BatchNorm and a leaky ReLu with parameter alpha=0.2. The latter can be repeated three times before outputting a 32-dimensional feature per pixel. The feature maps have the size h/n×w/n×f with n=8, where h is the height of the image, w is the width of the image, n is a proportion by which the image is downsized (e.g. by downsampling) and f is the feature depth (i.e. number of features). The design follows the proposed feature extraction from [Zhang, Yinda et al. ActiveStereoNet, ECCV 2018].

Turning temporarily to FIG. 5, this illustrates embodiment of the feature towers 26, 28. The numbers [C, K, S, D] indicate the used parameters for channels, kernel size, stride and dilation of the specific convolutional or ResNetBlock layer. Returning to FIG. 4, the outputs of stage 1 are a first feature map 30 of features of the left-hand image generated via the first feature tower 26 and a second feature map 32 of features of the right-hand image generated via the second feature tower 28.

After randomly sampling a scale parameter s from an interval [0, s_max], the two stages 2 and 4 prepare the two branches (1) and (2) (indicated generally as 18 and 20 in FIG. 3 discussed above) respectively for scale and depth estimation separately. This parameter is generated on the fly and saved for training purposes.

Stage 2: Feature Warping

This stage is part of the second branch 20 which performs task (2) noted above i.e. scale estimation. With further reference to FIG. 4, the second image feature map 32 from the right view is warped with a differentiable homography with d=1 with the focal length 1 onto the first feature map 30 of the left reference view such that the feature space difference can be calculated. The homography used is given by $$H_i(d) = K_i \cdot R_i \cdot \left(1 - \frac{(t_1 - t_i) \cdot n_1^T}{d}\right) \cdot R_1^T \cdot K_1^T$$

where 1 corresponds to the left reference view and i to the right view during training and where $K_i$ is the camera matrix (storing the intrinsic camera parameters); $R_i$ is the rotation and $t_i$ is the translation of the displacement of the camera i with respect to the reference camera 1; $n_i$ represents the normalized z-direction of the reference camera. This stage is shown by boxes 34 and 36 in FIG. 4.

Stage 3: Scale Estimation

This stage is a next part of the second branch 20 which performs task (2) noted above i.e. scale estimation. The left-hand feature map 30 and the right-hand feature map 32 are used. The feature difference is calculated in feature space where the dimensionality is h/n×w/n×f (box 38). An encoding stage 40 reduces this dimensionality to zero. The encoder gradually decreases the resolution to a zero dimensional output (a scalar). At each layer, the feature map resolution is reduced by a factor of two before the result is put through a fully connected layer that connects to a single neuron. This parameter is called s0 (box 42) and represents the scale change with respect to the normalized translation vector from a monocular SLAM system.

Stage 4: Differential Homography Warping

This stage forms part of the first branch 18 which performs task (1) noted above (i.e. scale-ambiguous depth estimation). The two feature maps (first, left-hand map 30 and second, right-hand map 32) are warped into different fronto-parallel planes on the reference system of the left camera (box 44) i.e. the homography for the left feature map is a 3×3 identity matrix. For the right-hand camera, the second feature map 32 is warped with different depth hypotheses. These two warpings are aggregated to form a single cost volume in the next stage.

Stage 5: Statistical Evaluation of Cost Volume

This stage forms a next part of the first branch 18 which performs task (1) noted above (i.e. scale-ambiguous depth estimation). The feature volumes from left and right are fused to one cost volume 46 in this stage. To be independent of the number of input views, a variance based cost metric M is used as proposed in [Yao, Yao et al. MVSNet, ECCV 2018]. With the feature volumes V_i, V (italic) being the dimensionality of the feature space (32 in the present example) and N=2 (the number of used frames), the cost volume C becomes $$M: \underbrace{\mathbb{R}^V \times \ldots \times \mathbb{R}^V}_{N} \to \mathbb{R}^V$$

$$C = M(V_i, \ldots, V_N) = \frac{\sum_{i=1}^{N}(V_i - \overline{V_i})^2}{N}$$

relative to the average cost volume $V_i$ (dash).

Stage 6: Guided Refinement

This stage forms a next part of the first branch 18 which performs task (1) noted above (i.e. scale-ambiguous depth estimation). In order to maintain a low memory footprint and be able to run on mobile devices (which, due to a desire to minimize size, have a constraint on processing capacity), the chosen resolution at this stage is ⅛. However, to maintain a full-resolution disparity map, an upsampling stage can be used in some embodiments. One suitable upsampling process is the guided hierarchical upsampling proposed by [Khamis, Sameh et al. StereoNet, ECCV 2018]. The selected depth is formed as a SoftMax-weighted linear combination of the depth values from the cost volume as given by:

$$d_i = \sum_{d=1}^{D} d \cdot \frac{\exp(-C_i(d))}{\sum_{d'}\exp(-C_i d')}.$$

where D is the maximum discretization in depth direction.

This yields a ⅛ depth map which is then put through the refinement network to refine its residual after bilinear upsampling. Skip connections from a downscaled input image as well as the depth map at the specific resolution are processed by a small network consisting of a convolution, BatchNorm, Leaky ReLu and two ResNet blocks. They are then concatenated to the processed upsampled disparity at a given stage, where the stages are hierarchically ordered by ⅛, ¼, ½, 1/1 (i.e. full resolution). These are indicated collectively in FIG. 4 by reference numeral 48. This passes four Residual Blocks and a convolution. At each individual scale, supervision with the scaled ground truth is summed in the loss.

Figure 6:
FIGS. 6 (a)-(f) illustrate stages of a disparity map using upsampling.
Figure 6:
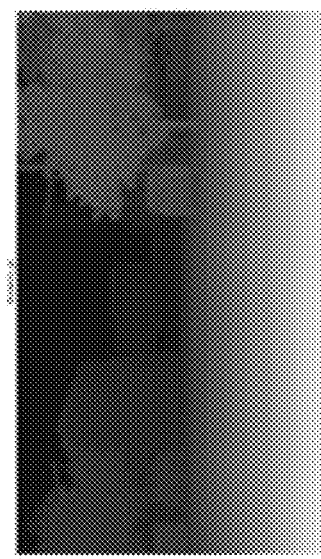
Figure 6:
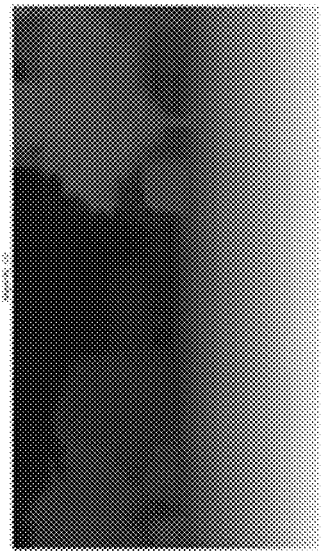
Figure 6:
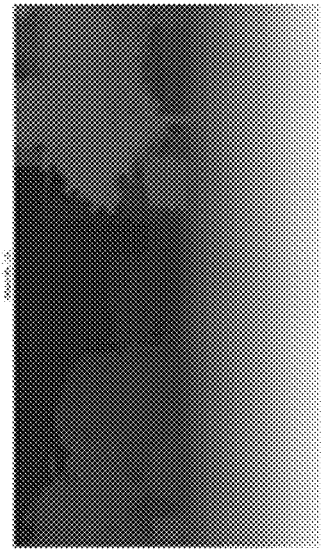
Figure 6:
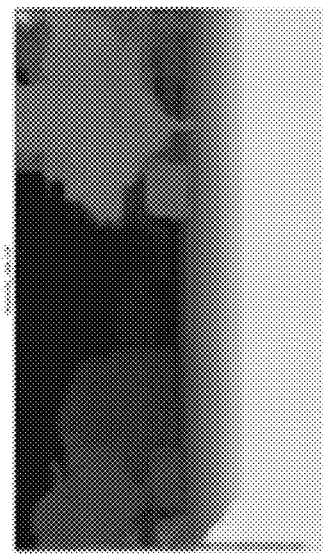
Figure 6:
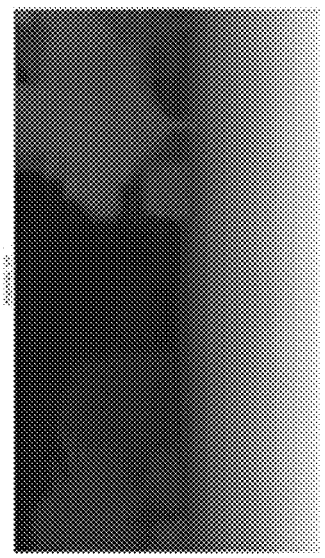

Turning to FIG. 6, this shows results of the different upsampling stages from a coarse disparity map to full resolution. The brightness of the depth maps colour-codes the distance of the pixel from the camera. While at ⅛$^{th}$ of the resolution (map (a)), only limited details are present, a hierarchical upsampling refines the residuals with the help of the skip connection from the input image. Map (b) shows ¼$^{th}$ of the resolution and map (c) shows ½$^{th}$ of the resolution. Ultimately, at full resolution (map (d)), the granularity of the ground truth (map (e)) is recovered. This is in particular prominent within the fine structures such as the leaves of the tree and the thin lamp pillars at the side of the road. The original image (f) is shown for comparison.

Stage 7: Scaling the Upsampled Depth Map

As discussed above, the upsampled depth map from the lower branch 18 (stages 4-6 in FIG. 4; task (1) depth estimation) is wrongly scaled by a mis-scaling parameter s. The output of stage 3 (stages 2 & 3 in FIG. 4; task (2) scale estimation) can be used to scale the depth values to real measurement units (e.g. metric units such as metres or non-metric units such as yards) such that it can be fully supervised by a ground truth depth map. The resulting depth estimate 50 is given by: s0*D_s, where the scale s0 is the output 42 of the upper branch of the network (stages 2 & 3 in FIG. 4—task (2) scale estimation) and D_s is the wrongly scaled depth map from the lower (stages 4-6 in FIG. 4—task (1) depth estimation) branch.

Figure 7:
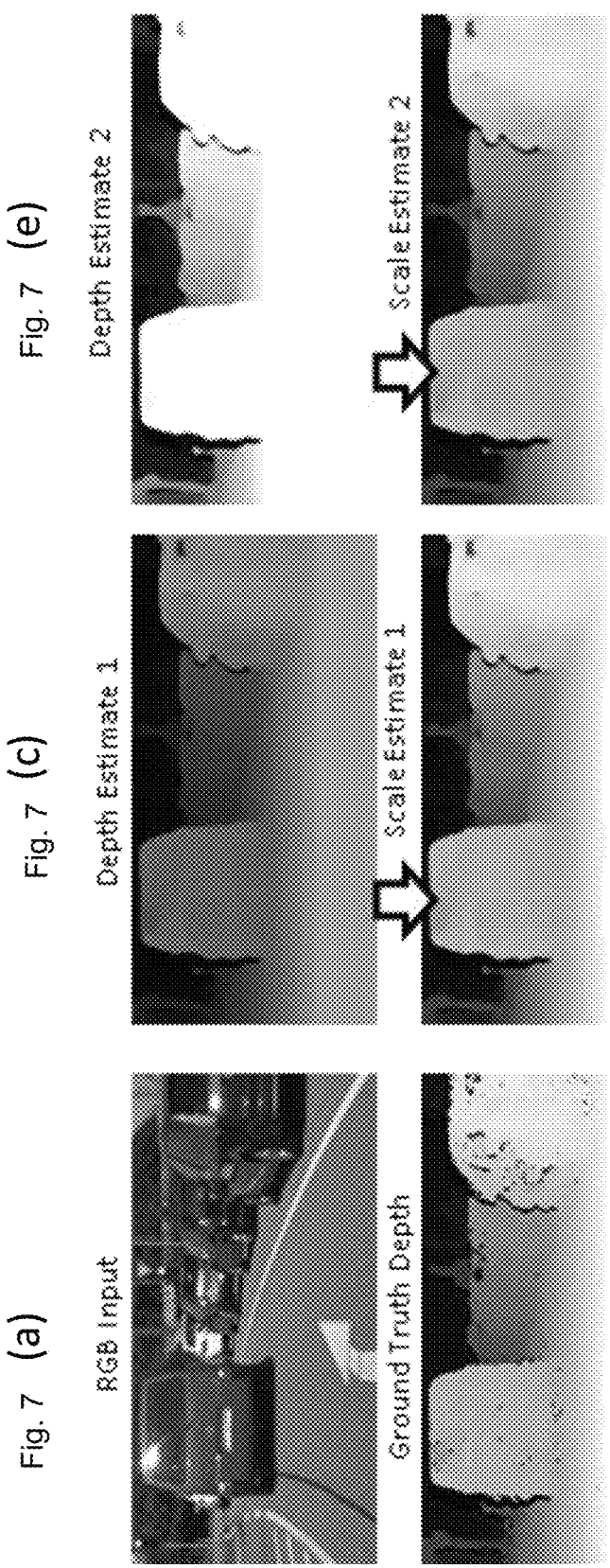
FIGS. 7 (a)-(f) illustrate a depth estimation refinement process by scale correction.

This stage is illustrated in FIG. 7, which shows the estimated depth scaling on two different real scene input images from the SceneFlow dataset [Cordts et al. CVPR 2016]. For comparison, the input image is shown as image (a) and the ground truth depth is shown as image (b). The black regions in the ground truth image (b) arise from invalid pixels. Images (c) and (e) show exemplary outputs of the scale estimation where the scaling is wrong. The depth estimation network of this stage 7 can correct the wrongly scaled depth (images (c) and (e)) to the final scale estimate (images (d) and (f) respectively).

Stage 8: Supervision

The full pipeline is trainable end-to-end as all operations are fully differentiable. If the ground truth depth values are given (indicated by reference numeral 52 in FIG. 4), a supervision by the depth map is possible. In some embodiments, in a (self-) supervised fashion, a stereo method (such as stages 4-6 described above but with known absolute displacement of the cameras) can be used to estimate the depth map which can be used to train the network on the fly. Once the full pipeline is trained the depth estimation output may look like the example shown in FIG. 8. In this example, the brightness of the depth maps colour-codes the distance of the pixel from the camera. Images (a), (b) and (c) show ⅛$^{th}$, ¼$^{th}$ and ½$^{th}$ resolution stages respectively. Image (d) shows the warped monocular depth at 1/1 resolution and image (e) shows the original left hand image 22. Images (a)-(d) correspond to the guided refinement upscaling of Stage 6. Thus supervision occurs at each scale.

The implemented loss function uses the generalized adaptive robust loss function by [Barron, Jonathan, A General and Adaptive Robust Loss Function, arXiv, 2019]

$$f(x, a, c) = \frac{|2-a|}{a}\left(\left(\frac{(x/c)^2}{|2-a|}+1\right)^{(a/2)} - 1\right)$$

with alpha=1 and c=2.

During inference, a classical SLAM pipeline can now be used for reconstruction and mapping of the environment while the fast real-time upper branch of the network can estimate the scale on-the-fly. In this way, measurement unit e.g. metrically-correct mappings and trajectories are reconstructed and a fully trained model thereby created.

Figure 9:
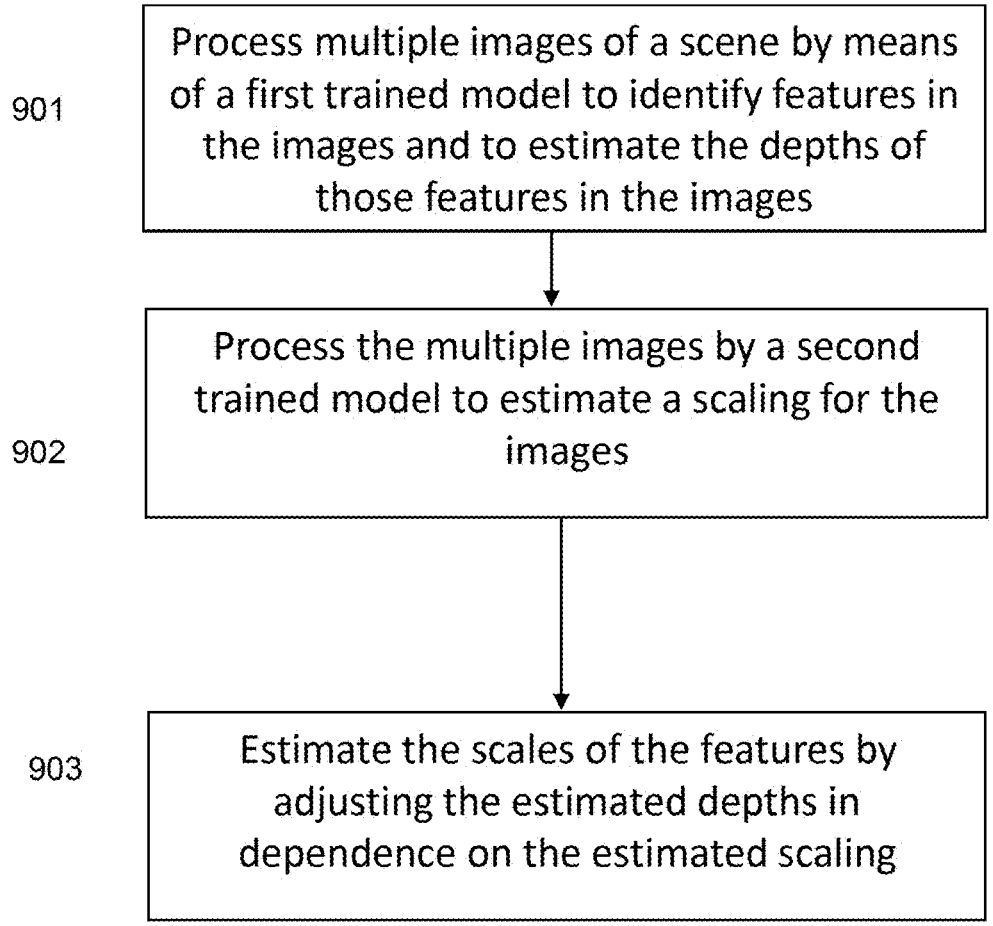
FIG. 9 shows an example of a method for estimating the scale and for correcting depth of image features of a scene.

FIG. 9 summarises a method of estimating the scale of features of a source image captured by a moving monocular camera. This method is performed using a neural network model trained by Stages 1-8 described above. Thus the training may have occurred using images captured from two cameras, but in this runtime method, a single, moving monocular camera can be used because on-the-fly depth correction is possible, as noted above. This may be a different camera from either of the cameras used in the training process. In operation 901, multiple images of a captured scene are processed using a first trained model to identify features in the images and to estimate the depths of those features in the images. These estimated depths may be relative distances, because only an assumed scaling factor (mis-scaling parameter s) can be used, as noted above in the discussion of Stage 7. This first trained model is performing the first task described above of scale-ambiguous depth estimation. In operation 902, the multiple images are processed by a second trained model to estimate a scaling for the images. This second trained model is performing the second task described above of scale estimation. At the next operation 903 the scales of the features are estimated by adjusting the estimated depths of operation 901 in dependence on the estimated scaling of operation 902. Thus the absolute depths in distances (e.g. in metres, yards etc.) can be determined.

An optional operation that can be used with the method of FIG. 9 is to use the first trained model on downscaled images of the scene to form a set of data which includes estimates of the depths of features in the downscaled images. This data can then be processed to upsample its resolution, as discussed above with reference to Stage 6.

Figure 10:
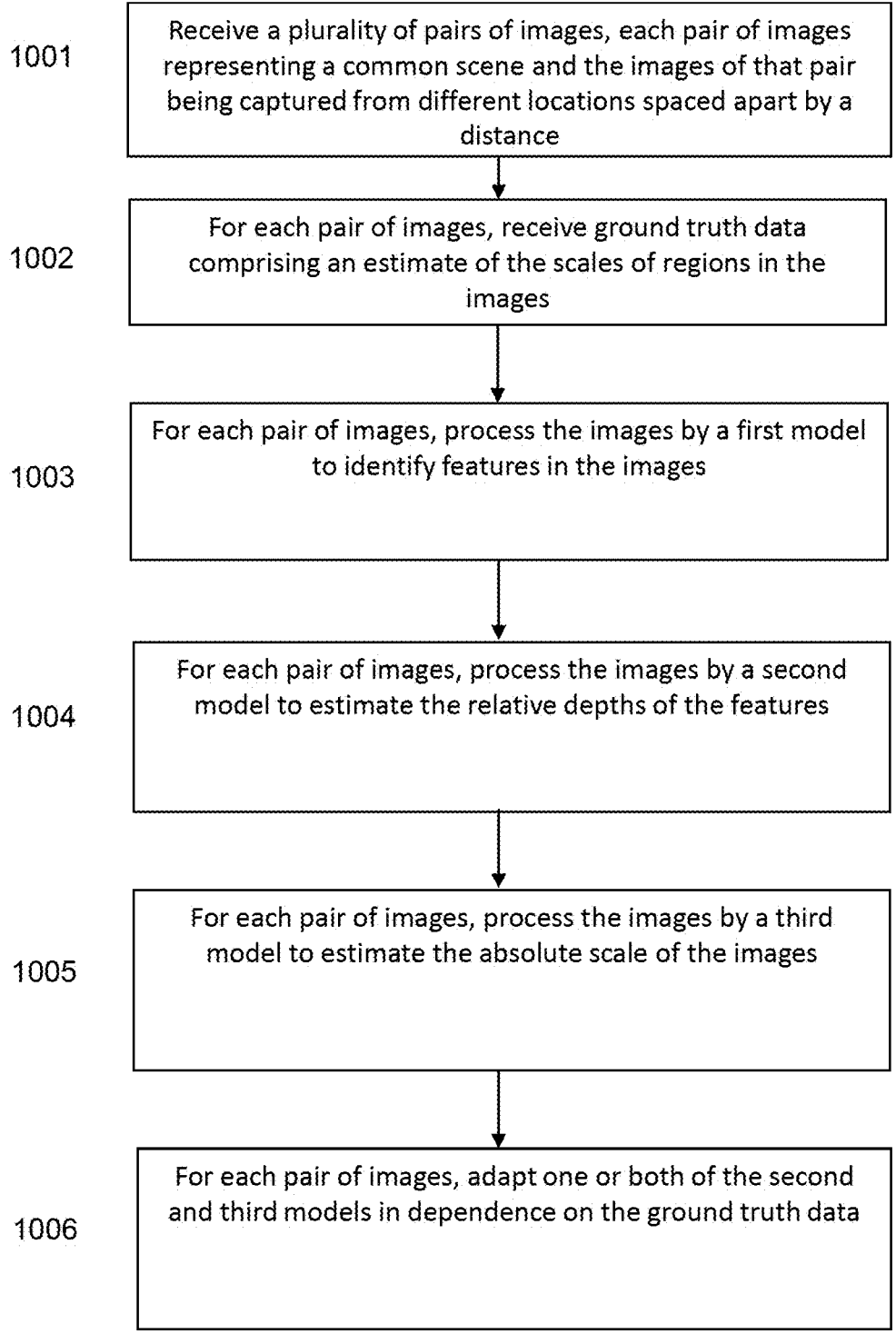
FIG. 10 shows an example of a method for training a model for estimating scale of image features of a scene.

FIG. 10 shows a method for training a model, which corresponds generally to Stages 1-8 discussed above. At operation 1001, a plurality of pairs of images is received, each pair of images representing a common scene, the images of that pair being captured from different locations spaced apart by a distance. The two images could be captured by different cameras or the same camera at two different locations. The remaining operations are all carried out for each pair of images. At operation 1002, ground truth data comprising an estimate of the scales of regions in the images is received. As mentioned above, this can be calculated using epipolar geometry applied to the principle of parallax, since two images are obtained at different locations. At operation 1003, the images are processed by a first model to identify features in the images. This could be performed by the feature tower pipeline described above with reference to FIG. 3. At operation 1004, the images are processed by a second model to estimate the relative depths of the features. This could be done as described above with reference to Stages 4-6 discussed above. Thus the second model here is performing the first task described above of scale-ambiguous depth estimation. At operation 1005, the images are processed by a third model to estimate the absolute scale of the images. This could be done as described above with reference to Stage 3 discussed above. Thus the third model here is performing the second task described above of scale estimation. At operation 1006, one or both of the second and third models is adapted in dependence on the ground truth data.

Figure 11:
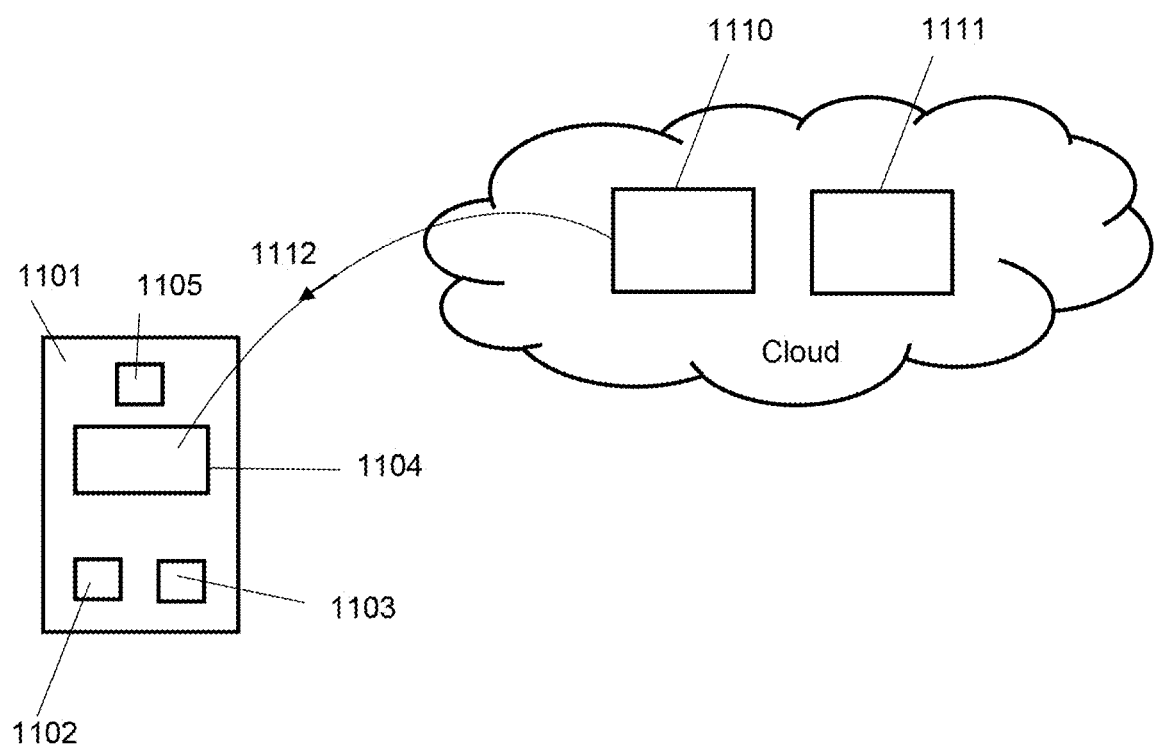
FIG. 11 shows an example of a system architecture including a camera configured to perform scale estimation.

FIG. 11 shows an example of an architecture including a camera that uses a model to perform scale estimation and depth resolution. A camera 1101 is connected to a communications network 1112. The camera 1101 comprises an image sensor 1102. The camera 1101 also comprises a memory 1103, a processor 1104 and a transceiver 1105. The memory 1103 stores in non-transient form code that can be run by the processor 1104. In some embodiments, that code may include neural models as described above. The algorithm may include code that is directly executable by the processor and/or parameters such as neural network weightings derived by training a model as described above, which are not directly executable instructions but serve to configure other executable code that is stored in the memory 1103. The memory 1103 may also store raw and/or processed image data. The transceiver 1105 may be capable of transmitting and receiving data over either or both of wired and wireless communication channels. For example, it may support Ethernet, IEEE 802.11B and/or a cellular protocol such as 4G or 5G.

Such a camera 1101 typically includes some onboard processing capability. This could be provided by the processor 1104. The processor 1104 could also be used to implement other functions of the device.

The transceiver 1105 is capable of communicating over a network 1112 with other entities 1110, 1111. Whilst two entities are shown, more may be provided. Those entities may be physically remote from the camera 1101. The network 1112 may be a publicly accessible network such as the internet. The entities 1110, 1111 may be based in the cloud. The entity 1110 may be a computing entity. The entity 1111 may be a command and control entity. These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 1105 of the camera 1101. Their memories store in a non-transient way code that is executable by the processor to implement the respective entity in the manner described herein.

The command and control entity 1111 may train a model used for estimating the scale and depth of features of a source image. This is typically a computationally intensive task, even though the resulting model may be efficiently described, so it may be efficient for the development of the algorithm to be performed in the cloud, where significant energy and computing resource is likely to be available. This may be more practical than forming such a model at a typical camera, which may be limited in terms of processor size and hence function.

In one embodiment, once the algorithm has been developed in the cloud, the command and control entity 1111 can automatically form a corresponding model upon receipt of the algorithm and cause it to be transmitted to the relevant camera device to be performed. In this example, the method is performed at the camera 1101 by the processor 1104.

In another possible embodiment, an image may be captured by the camera sensor 1102 and the image data may be sent by the transceiver 1105 to the cloud for processing, including scale estimation of scene features. The resulting target image could then be sent back to the camera 1101, via the network 1112.

Therefore, the method be deployed in multiple ways, for example in the cloud, on the device, or alternatively in dedicated hardware or a mixture of these. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The scale estimation may also be performed at the camera, in a dedicated piece of hardware, or in the cloud.

It can be understood from the above that embodiments of the application are advantageous for a number of reasons. In particular, simultaneous training of tasks (1) and (2) provides the following advantages:

Fusion of stereo depth and scale estimation in an end-to-end learning pipeline—this enables leveraging high-quality geometrical SLAM methods with meaningful scale from interdependent features, thereby providing high-resolution and high-accuracy distance measures.

A solution to scale ambiguity in image-only monocular SLAM—in this pipeline, there is no need for additional sensors or other modalities such as IMU, LIDAR, active stereo, second camera, etc. at runtime Self-supervision by stereo SLAM—an additional sensor can be used during training time to implement multiview imaging. Thus additional ground truth data is not needed as this can be generated on-the-fly with a second camera.

A spatio-temporal pipeline, which is agnostic to the quantity of input images, is created—warping of the different images (in space and time) to a reference can be done with differentiable homography warping. Statistical analysis on these warped versions is independent of the number of input images and enables the number of input images to be changed at inference time. In this way, a second, third, etc. camera can be used for both training and inference. The pipeline can be used with both mono and stereo inputs, both in temporal and spatial domain, at runtime.

Drift can be detected by statistical analysis of the temporal scale parameter—small errors accumulate in classical monocular SLAM approaches (this is called drifting) which is difficult to detect. A simple analysis of the scale parameter over time (which can be run in a different thread from the scaling and depth map creation) directly reveals drifting issues. This can be used as a global optimization to force loop closing/adjust the depth maps, which in conventional systems are both costly methods to minimize drifting.

Real time applicability—the two tasks can be used individually (once trained) which enables real-time scale estimation with task (2).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present application may consist of any such individual feature or combination of features. In view of the foregoing description it will be evident to a person skilled in the art that various modifications may be made within the scope of the application.

The invention claimed is:

1. An image processing device, comprising:
a processor configured to perform operations of estimating a scale of image features, the operations comprising:
processing a plurality of images of a scene using a first trained model to identify features in the plurality of images and to estimate depths of the features in the plurality of images, wherein the plurality of images comprise a first set of images captured at a first location and a second set of images captured at a second location;
processing the plurality of images using a second trained model to estimate a scaling parameter for the images based on a feature difference in feature space between a first feature map corresponding to the first set of images and a second feature map corresponding to the second set of images; and
estimating scales of the features by adjusting the estimated depths based on the estimated scaling parameter.

2. The image processing device of claim 1, wherein the first location and the second location are different locations.

3. The image processing device of claim 2, wherein the first and second trained models are configured to operate independent of the different locations.

4. The image processing device of claim 2, wherein the plurality of images comprise images of the scene captured at different times.

5. The image processing device of claim 1, wherein the plurality of images are frames in a common video stream.

6. The image processing device of claim 1, comprising a camera, wherein the plurality of images are images captured by the camera.

7. The image processing device of claim 1, wherein the estimated depths are relative distances.

8. The image processing device of claim 1, wherein the estimated scales are absolute distances.

9. The image processing device of claim 1, wherein the processor is configured to:
operate the first trained model on downsampled images of the scene to form a set of data comprising estimates of depths of features in the downsampled images; and
process the set of data to upscale its resolution.

10. A method, comprising:
processing a plurality of images of a scene using a first trained model to identify features in the plurality of images and to estimate depths of the features in the plurality of images, wherein the plurality of images comprise a first set of images captured at a first location and a second set of images captured at a second location;
processing the plurality of images using a second trained model to estimate a scaling parameter for the images based on a feature difference in feature space between a first feature map corresponding to the first set of images and a second feature map corresponding to the second set of images; and
estimating scales of the features by adjusting the estimated depths based on the estimated scaling parameter.

11. The method of claim 10, wherein the first location and the second location are different locations.

12. The method of claim 11, wherein the first and second trained models are configured to operate independent of the different locations.

13. The method of claim 11, wherein the plurality of images comprise images of the scene captured at different times.

14. The method of claim 10, wherein the plurality of images are frames in a common video stream.

15. The method of claim 10, comprising a camera, wherein the plurality of images are images captured by the camera.

16. The method of claim 10, wherein the estimated depths are relative distances.

17. The method of claim 10, wherein the estimated scales are absolute distances.

18. The method of claim 10, further comprising:
operating the first trained model on downsampled images of the scene to form a set of data comprising estimates of depths of features in the downsampled images; and
processing the set of data to upscale its resolution.

19. A non-transitory computer readable medium storing instructions that, when executed by a processing device, cause the processing device to:
process a plurality of images of a scene using a first trained model to identify features in the plurality of images and to estimate depths of the features in the plurality of images, wherein the plurality of images comprise a first set of images captured at a first location and a second set of images captured at a second location;

process the plurality of images using a second trained model to estimate a scaling parameter for the images based on a feature difference in feature space between a first feature map corresponding to the first set of images and a second feature map corresponding to the second set of images; and estimate scales of the features by adjusting the estimated depths based on the estimated scaling parameter.

20. The non-transitory computer readable medium of claim 19, wherein the first location and the second location are different locations; and the first and second trained models are configured to operate independent of the different locations.

* * * * *